(12) United States Patent
Nuñez Polo et al.

(10) Patent No.: US 8,834,100 B2
(45) Date of Patent: Sep. 16, 2014

(54) WIND TURBINE BLADE BEARING AND WIND TURBINE THAT MAKES USE THEREOF

(75) Inventors: Miguel Nuñez Polo, Navarra (ES); José Miguel García Sayés, Navarra (ES)

(73) Assignee: Acciona Windpower, S.A. (ES)

( * ) Notice: Subject to any disclaimer, the term of this patent is extended or adjusted under 35 U.S.C. 154(b) by 793 days.

(21) Appl. No.: 12/966,037

(22) Filed: Dec. 13, 2010

(65) Prior Publication Data

US 2011/0142645 A1 Jun. 16, 2011

(30) Foreign Application Priority Data

Dec. 16, 2009 (ES) .................................... 200931178

(51) Int. Cl.
| | | |
|---|---|---|
| *F01D 15/12* | (2006.01) | |
| *F03D 11/02* | (2006.01) | |
| *F03D 1/06* | (2006.01) | |
| *F03D 11/00* | (2006.01) | |

(52) U.S. Cl.
CPC ............ *F03D 1/0658* (2013.01); *F05B 2250/30* (2013.01); *F05B 2240/50* (2013.01); *F05B 2250/314* (2013.01); *Y02E 10/722* (2013.01); *Y02E 10/721* (2013.01); *F03D 11/0008* (2013.01)
USPC ...................... 415/122.1; 415/229; 416/170 R

(58) Field of Classification Search
USPC .............. 415/122.1, 229; 416/147, 155, 156, 416/157 R, 158, 244 R, 248
See application file for complete search history.

(56) References Cited

U.S. PATENT DOCUMENTS

| | | | |
|---|---|---|---|
| 4,180,369 A | 12/1979 | Ottosen .............................. 415/2 |
| 6,428,274 B1 * | 8/2002 | Hehenberger ................ 416/153 |
| 6,783,326 B2 * | 8/2004 | Weitkamp et al. ................. 416/1 |
| 7,547,985 B2 * | 6/2009 | Takaichi et al. .................. 290/55 |
| 7,854,592 B2 * | 12/2010 | Bech ............................. 416/155 |

FOREIGN PATENT DOCUMENTS

| | | |
|---|---|---|
| DE | 20 2006 013 519 | 12/2006 |
| EP | 1 019 631 | 7/2000 |

\* cited by examiner

*Primary Examiner* — Edward Look
*Assistant Examiner* — Christopher J Hargitt
(74) *Attorney, Agent, or Firm* — Ostrolenk Faber LLP

(57) ABSTRACT

A wind turbine blade bearing with a fixed ring fixed to a hub of the wind turbine and a moving ring whereto the blade is fixed by corresponding fixing elements; the bearing making it possible to avoid the collision of the blade with the wind turbine tower by providing a separation therebetween via the disposal of the blades at an angle with respect to the wind turbine hub; where the angle is given by the bearing of the blade pitch change system. The separation is achieved since a rear face of the moving ring is in contact with the blade so that a plane defined by the rear face is perpendicular to the longitudinal direction of the blade, the rear face not being perpendicular to the axis of rotation of the bearing.

12 Claims, 4 Drawing Sheets

WIND TURBINE BLADE BEARING AND WIND TURBINE THAT MAKES USE THEREOF

OBJECT OF THE INVENTION

The present invention relates to blade pitch change systems of wind turbines, more specifically the rolling elements disposed between the blade and the hub.

The object of the invention consists of a bearing for the blade pitch change system that makes it possible to avoid the collision of the blades with the wind turbine tower.

BACKGROUND OF THE INVENTION

In upwind horizontal axis wind turbines it is necessary to separate the blade from the tower sufficiently to avoid it from being able to hit the tower when the blade bends due to the effect of the wind thrust.

Furthermore, it is typical to incorporate a blade pitch change mechanism or system, which changes the blade angle, thus regulating the power collected from the wind. For this purpose, a bearing is incorporated that is partly fixed to a hub and the other part to the blade. An actuator that may be electric or hydraulic moves the blade to the appropriate angle for the wind turbine's operating conditions. To reduce the loads in the pitch actuation, it is convenient that the blade at rest is not aligned with the pitch axis.

To increase the distance of the blade to the tower, U.S. Pat. No. 4,180,369 describes a rotor configuration consisting of mounting the blades at an angle, so that the rotor describes a cone on rotating. An alternative to this solution is to make the blades forwardly curved, as described in EP1019631.

A solution that increases the distance between blade and tower whilst misaligning the longitudinal direction of the blade with respect to the pitch axis is described in DE202006013519. To implement said solution, it is necessary to cut the blade angle, maintaining the bores wherethrough the hold-down bolts pass perpendicular to the contact surface between the bearing and the blade, and which, therefore, form an angle with the longitudinal direction of the blade. The bearing is of conventional type, the hold-down bolts of the blade being placed parallel to the pitch axis and perpendicular to the contact surface between blade and bearing.

DESCRIPTION OF THE INVENTION

The bearing object of the invention is a blade bearing of the blade pitch change system which provides an angle between the longitudinal direction of the blade and the axis of rotation, thus increasing the separation between the blade and the tower and reducing the loads in the pitch actuator (blade pitch change system).

The bearing object of the invention comprises a fixed part which is fixed, a fixed ring, to the wind turbine hub and a moving part, a moving ring, which is fixed to the wind turbine blade, allowing the rotation thereof.

In the blade bearing object of the invention, the moving part comprises a rear face in contact with the blade which is not perpendicular to the axis of rotation of the bearing and also bores perpendicular to said rear face which pass through it, said moving part, to pass the bolts that fix the blade.

One of the advantages of this system with respect to one of the solutions present in the state of the art is that the blades are conventional: the cut in the blade base is perpendicular to the longitudinal direction thereof; in this way, an inclined cut in the blade is not required, therefore modifying the conventional blades. Therefore, it is not necessary to use special tools to manufacture the blade; further making it possible to apply the solution proposed by the invention using already manufactured blades.

Furthermore, in contrast to the state of the art, the bolts follow the longitudinal direction of the blade, distributing the stresses optimally both in the root of the blade and in the bearing.

The bearing object of the invention may be disposed in blade pitch change systems which have hydraulic or electric mechanisms for actuating the blade pitch change system.

When said actuation is hydraulic, an actuator cylinder is disposed and a plate is interposed between the bearing and the fixing means of the blade. A shaft is, in turn, fixed to said plate whereon the hydraulic pitch cylinder acts which has a direction parallel to the pitch axis, not perpendicular to the plate.

However, when the actuation is electric, the inner face of the moving part of the bearing is toothed. In this case, the blade pitch change system comprises an electric motor fixed to the hub which acts by a pinion on said toothed surface to make the blade rotate.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description, where the following has been represented with illustrative and non-limiting character.

PREFERRED EMBODIMENT OF THE INVENTION

Figure 1:
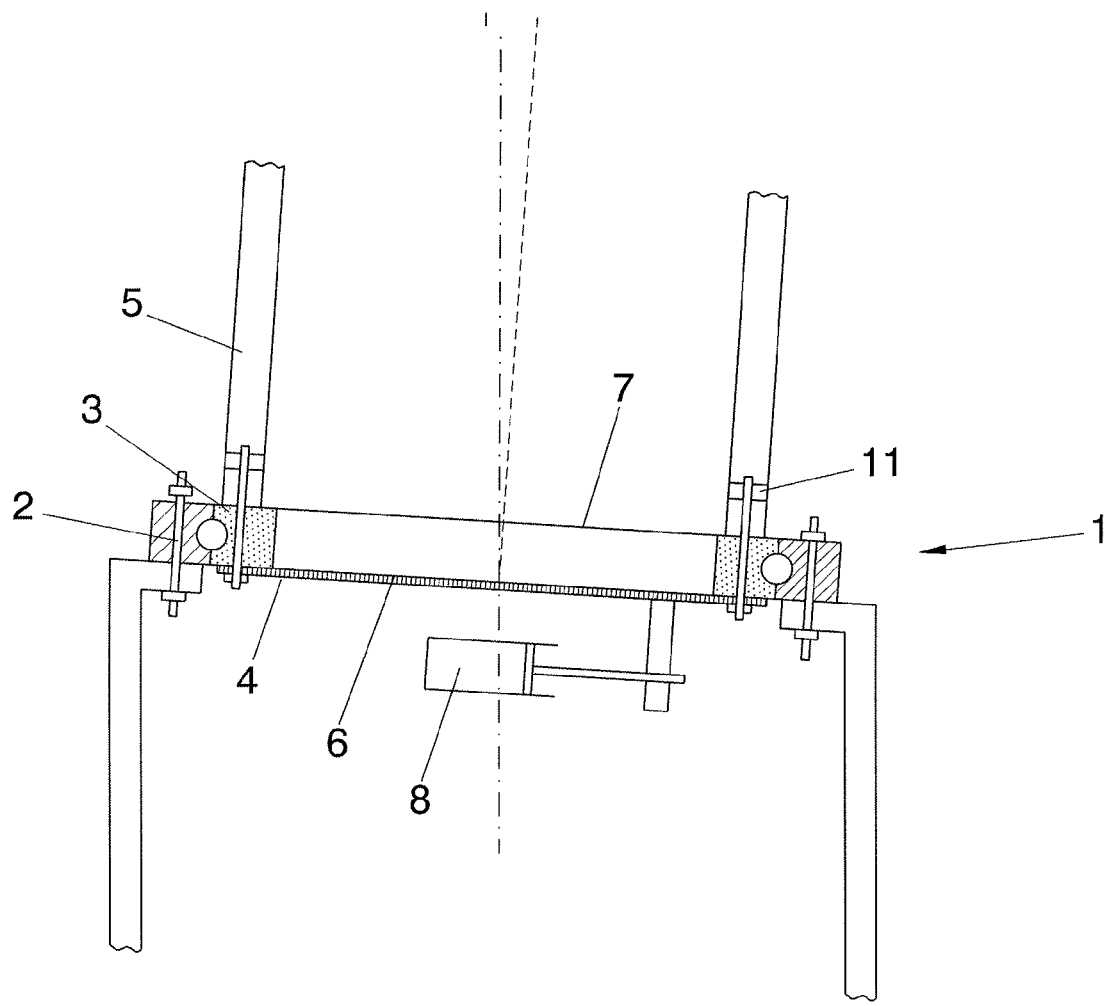
FIG. 1 shows a schematic view of a solution present in the state of the art based on conning.
Figure 2:
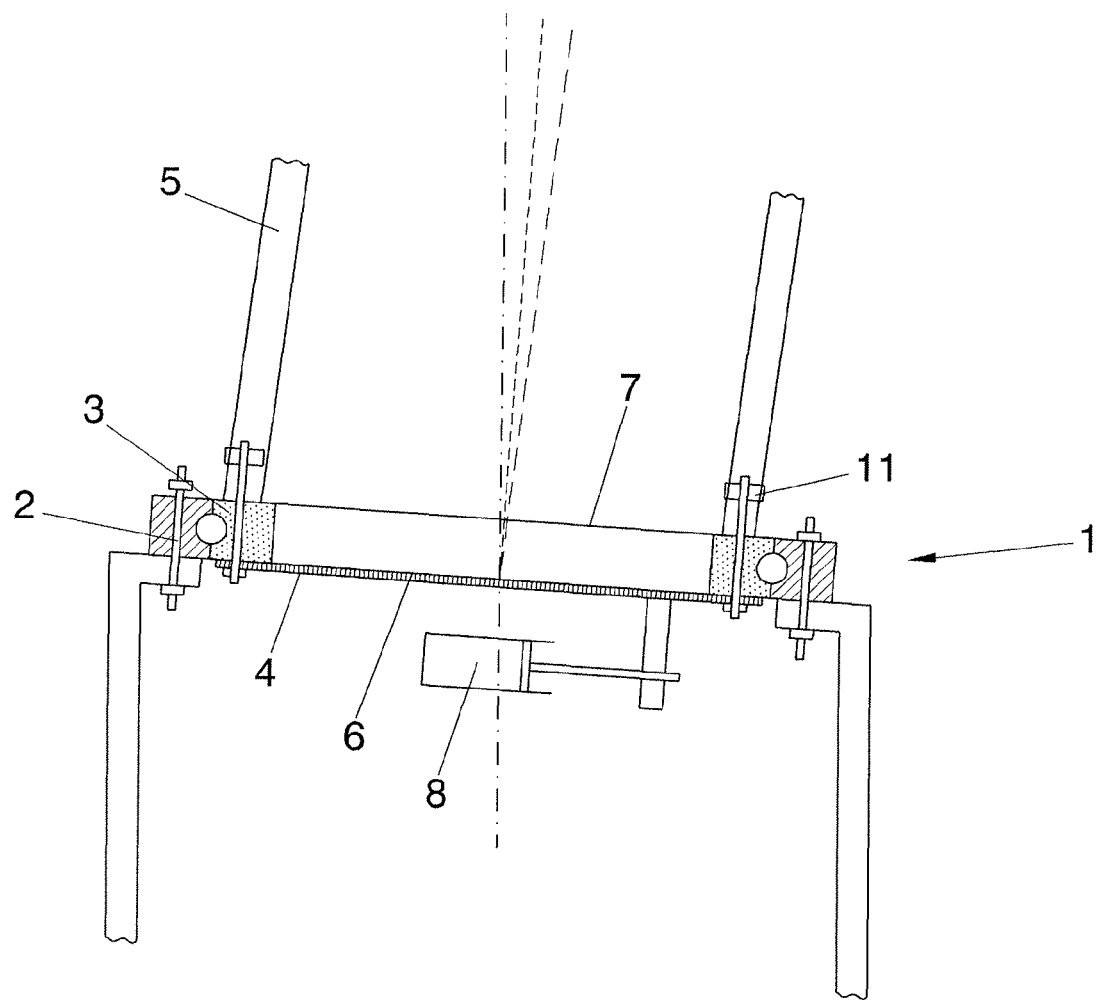
FIG. 2 shows a schematic view of a solution present in the state of the art based on conning and preconning in the blade.

In light of the figures, a preferred embodiment of the bearing (1) for blades (5) in blade (5) pitch change systems of wind turbines, which is the object of the invention, is described below.

In a preferred embodiment, a rear face (7) of a moving ring (3) of the bearing (1), in contact with the blade (5), is perpendicular to the longitudinal direction of the blade (5) and is not perpendicular to the axis of rotation of the bearing (1).

In a preferred embodiment, the bearing comprises bores (10) which pass through the moving ring (3) and which are adapted to house the fixing means (11) of the blade (5). Said bores (10) are perpendicular to the rear face (7).

In a preferred embodiment, the angle between the rear face (7) of the bearing (1) and the axis of rotation of the bearing (1) is between 84 and 89°.

In a preferred embodiment of the object of the invention, the moving ring (3) of the bearing (1) is located inside a fixed ring (2) of the bearing (1) and the inner face of said moving ring (3) is a cylindrical surface whose axis of revolution is aligned with the longitudinal direction of the blade (5).

Figure 3:
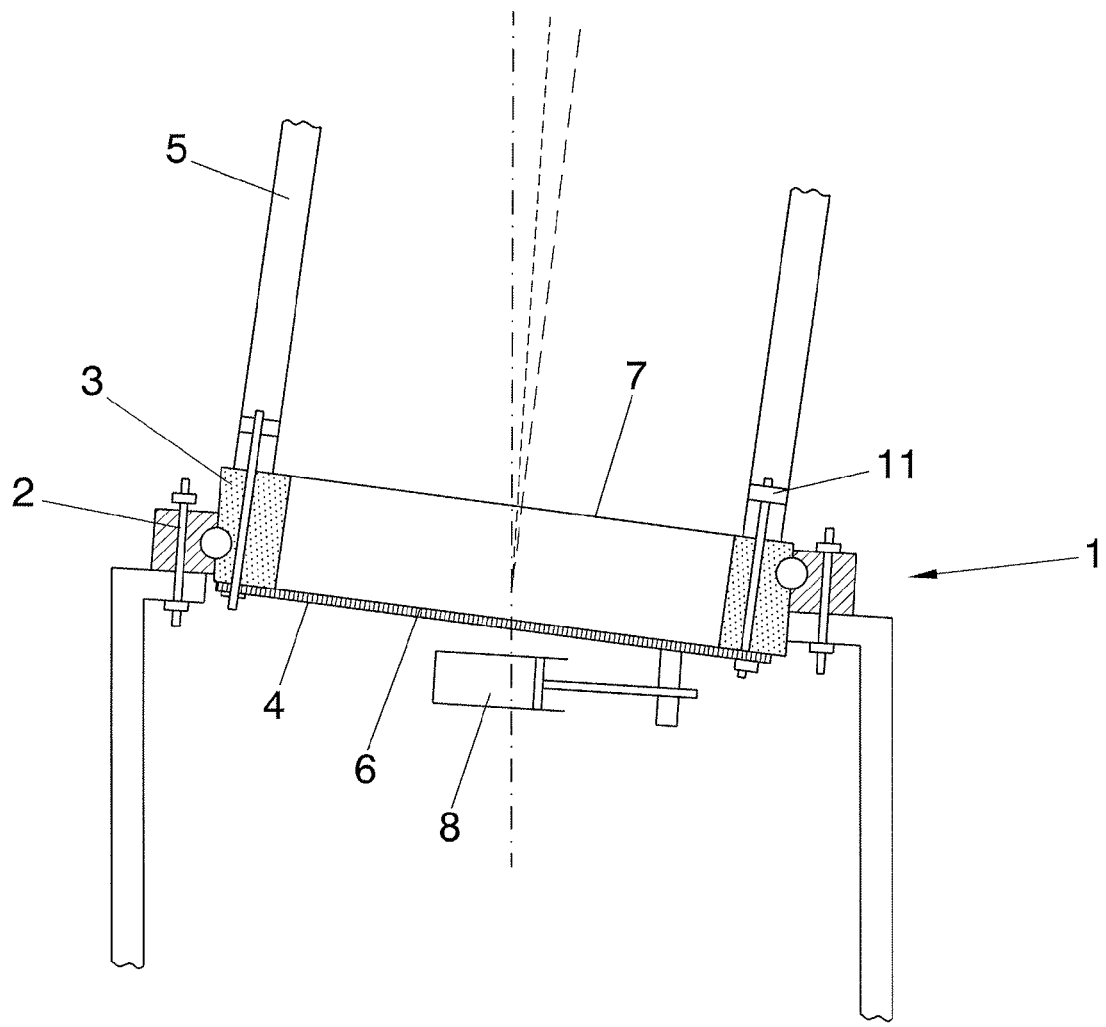
FIG. 3 shows a schematic view of the solution object of the invention.
Figure 4:
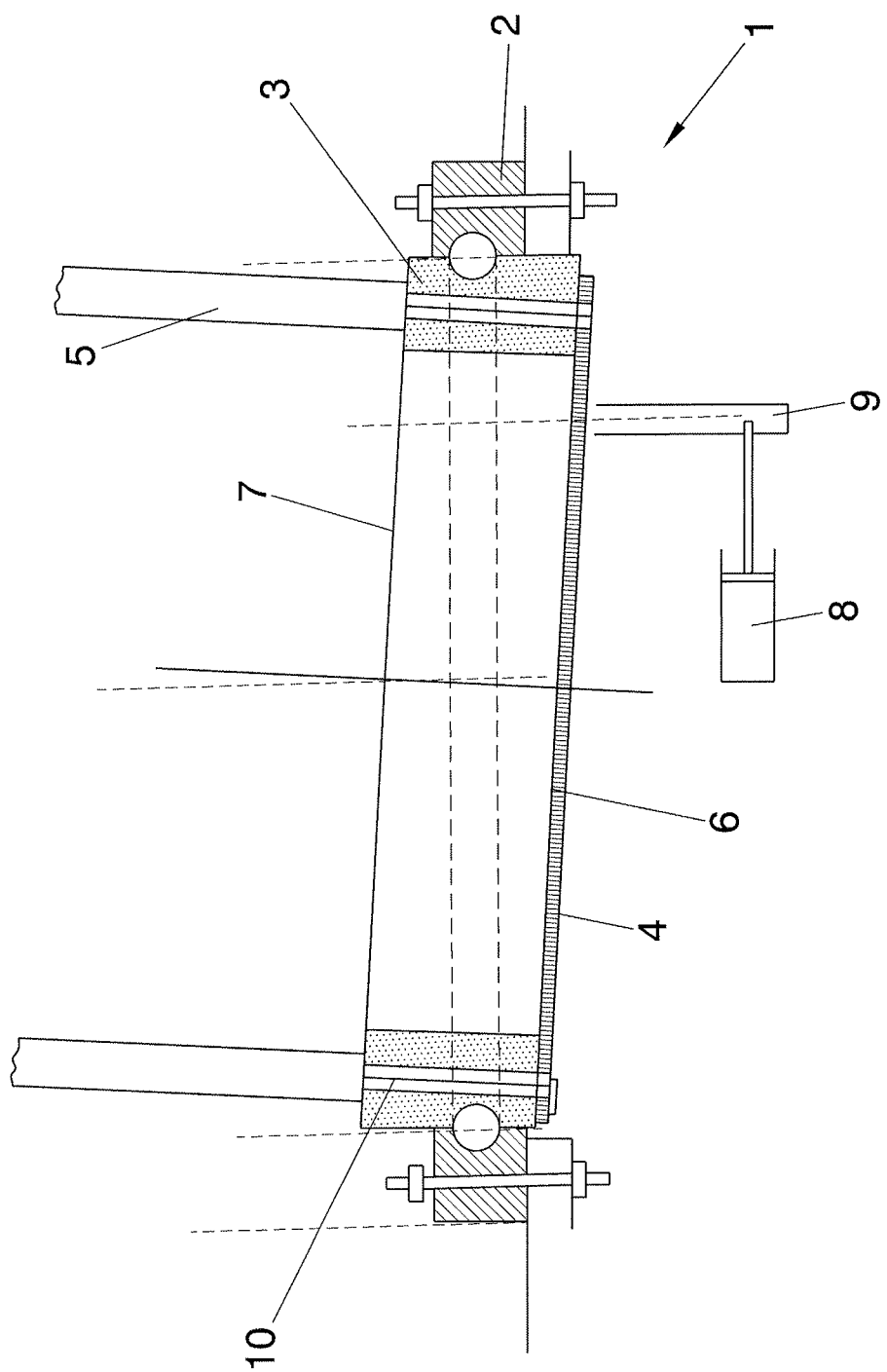
FIG. 4 shows a close-up schematic view of the bearing of the solution proposed by the object of the invention.

As observed in FIG. 3, this disposal is the result of a manufacturing process of the moving ring (3) of the bearing (1), comprising a machining of the rear face (7) and of the opposite parallel surface, the execution of through-bores (10)

perpendicular to said rear face (7), which are shown in greater detail in FIG. 4, and a machining of the inner cylindrical surface of the moving ring (3), perpendicular to the contact surface between the bearing (1) and the blade (5). The blade (5) is fixed to the moving ring (3) of the bearing (1) by fixing means (11), passing through the bores (10).

A tool will be used to give an angle to the moving ring (3) thus manufactured and a rolling surface is machined, including raceways of the balls or cylinders, so that said rolling surface is provided with an angle not perpendicular to the rear face (7), of the moving ring (3) designed to be in contact with the blade (5).

In a preferred embodiment of the object of the invention and as observed in FIG. 4, the blade (5) pitch change system is hydraulic. A plate (4) is disposed on the front face (6), opposite the rear face (7) of the moving ring (3). A shaft (9) is in turn fixed to said plate (4), whereon a hydraulic cylinder (8) of the hydraulic blade pitch change system (5) acts. The shaft (9) has a direction parallel to the pitch axis, therefore not being perpendicular to the plate (4).

In a preferred embodiment, both the rear face (7) of the moving ring (3), in contact with the blade (5), and the front face (6), opposite said rear face (7), are parallel to one another and therefore neither are perpendicular to the axis of rotation of the bearing (1).

In an alternative embodiment, the actuation of the blade pitch change system (5) is electric. In that case, the inner face of the moving ring (3) is toothed and the blade pitch change system (5) comprises an electric motor fixed to the hub that acts by a pinion on said toothed surface to make the blade (5) rotate.

The invention claimed is:

1. Wind turbine comprising at least one blade and a bearing, the bearing comprising a fixed ring fixed to a hub of the wind turbine, and a moving ring whereto the blade is fixed by a corresponding fixed connection,
    wherein a rear face of the moving ring is in contact with the blade so that a plane defined by the rear face is perpendicular to the longitudinal direction of the blade, and
    the rear face is not perpendicular to the axis of rotation of the bearing such that, when the blade is in a position in which the wind thrust is maximum, the separation between the blade and a tower of the wind turbine is greater than the separation in a case where the rear face of the moving ring is perpendicular to the axis of rotation of the bearing.

2. Wind turbine according to claim 1, further comprising bores perpendicular to the rear face which pass through the moving ring and which are configured to house the fixed connection of the blade to the moving ring.

3. Wind turbine according to claim 2, wherein the angle between the rear face and the axis of rotation of the bearing is between 84 and 89°.

4. Wind turbine according to claim 1, wherein the angle between the rear face and the axis of rotation of the bearing is between 84 and 89°.

5. Wind turbine according to claim 1, wherein the moving ring is interior with respect to the fixed ring and the inner surface of the moving ring is perpendicular to the rear face.

6. Wind turbine according to claim 5, wherein the inner surface of the moving ring is toothed.

7. Wind turbine according to claim 1, further comprising a plate whereto a shaft is fixed, whereon a hydraulic cylinder acts and which is located on a front face of the moving ring opposite the rear face.

8. Wind turbine according to claim 7, wherein the shaft whereon the hydraulic cylinder acts is parallel to the axis of rotation of the bearing.

9. Wind turbine blade bearing comprising a fixed ring designed to be fixed to a hub of the wind turbine and a moving ring designed to fix the blade on its rear face, wherein said rear face is not perpendicular to the axis of rotation of the bearing and the moving ring comprises bores that are not parallel to the axis of rotation of the bearing and are configured to house a fixed connection to fix the blade to the moving ring.

10. Bearing according to claim 9, wherein the rear face and the front face of the moving ring are parallel to one another.

11. Bearing according to claim 9, wherein the angle between the rear face and the axis of rotation of the bearing is between 84° and 89°.

12. Bearing according to claim 9, wherein the moving ring is interior to the fixed ring.

* * * * *